United States Patent Office 2,730,449
Patented Jan. 10, 1956

2,730,449

PROCESSES FOR THE PREPARATION OF INOCULATING MATERIALS FOR CONCENTRATED MILK PRODUCTS AND FOR IMPROVING THE CRYSTALLIZATION OF LACTOSE IN CONCENTRATED MILK PRODUCTS

Theo Rudolph De Vries, Bedum, Netherlands, assignor to De Cooperatieve Fabriek Van Melkproducten Te Bedum, Bedum, Netherlands, a corporation of the Netherlands No Drawing. Application November 22, 1950, Serial No. 197,176

Claims priority, application Netherlands November 24, 1949

21 Claims. (Cl. 99—55)

This invention relates to processes for the preparation of inoculating materials for concentrated milk products and for improving the crystallization of lactose in such products.

It is known that in the preparation of concentrated milk products in which the lactose for the greater part crystallizes on cooling, in particular in the preparation of condensed whole and skim milk, the crystals of lactose sometimes tend to grow too large on cooling. This defect is referred to by the terms "coarse" or "sandy," according to the size of the crystals. The cause of this defect is to be found in an incorrect ratio existing between the rate of formation of nuclei and the rate of growth of the crystals.

Various methods have previously been proposed to prevent the occurrence of this defect in concentrated milk products, especially in connection with milk products such as condensed whole and skim milk. Thus, attempts have been made to promote the rate of nuclei formation in the concentrated milk product by stirring and scraping along the walls of the coolers whilst endeavouring to keep the rate of nuclei formation at its optimum value in relation to the rate of crystal growth by maintaining the most favourable temperature.

Another known method consisted in the addition to the concentrated milk product to be treated of condensed milk from a previous lot as inoculating material.

When using the known methods above mentioned, the result, however, is generally dependent on chance circumstances which cannot be properly controlled, so that the result does not come up to optimum requirements.

Another method that has been proposed was to add ground lactose to the condensed milk products. This method would be effective, if the lactose could be ground to a sufficient degree of fineness. In practice, however, this has been found impossible, the size of the particles in one and the same sample of the ground lactose varying considerably.

The present invention has for its object to overcome the difficulties above referred to in the manufacture of concentrated milk products. For this purpose according to the present invention a process for the preparation of an inoculating material suitable for improving the crystallization of lactose in concentrated milk products consists in pulverizing a protein and/or other water-soluble high-molecular compound, and a lactose-containing powder which contains the lactose in the crystallized state, in a small quantity of a concentrated milk product not yet containing any crystallized lactose.

As is known, lactose is present in a vitreous state in the powder obtained by the drying of milk by the spraying process, and upon absorption of sufficient moisture it is converted into the crystalline state. It has been found that these lactose crystals in milk powder are agglomerates of extremely fine crystals, the latter being readily released by rubbing of the powder. However, this is not only the case with milk powder. Any water-soluble high-molecular compound, such as gelatine, sodium alginate, or carboxymethyl cellulose, which is mixed with lactose and which is brought into the dry condition from a solution by rapid drying, preferably by means of the spraying process, contains the lactose in the vitreous state; on absorption of moisture the lactose then crystallizes into the aforementioned agglomerates of extremely fine crystals. The formation of these microcrystals seems to be due to the slight rate of diffusion and the difficult crystallization in the particular medium in question. These micro-crystals are much smaller and much more uniform in size than the lactose particles obtained by grinding crystallized lactose.

A very suitable starting material for use in the preparation of the inoculating material is milk powder, preferably obtained according to the spraying process.

If the starting material contains the lactose in the vitreous state, it should be made to absorb such a quantity of water that the lactose passes into the crystalline state. This may be done very effectively by spreading the powder in a thin layer and spraying the requisite quantity of water over it.

As has been mentioned above, the powder is pulverized in a small quantity of condensed milk product not yet containing any crystallized lactose. For this purpose it is preferred to take a concentrated milk product which is supersaturated in lactose; this of course, as has been stated, must not yet contain any crystallized lactose.

By means of the present process a very fine inoculating material is obtained, which is very homogeneous as regards the size of the particles. Consequently it is possible to influence the size and the quantity of the lactose crystals separating in the concentrated milk products almost at will. No special coolers and scrapers are required. Any cooler provided with a suitable stirring device will produce excellent results. It is possible to add to any concentrated milk product, if desired, a preparation corresponding to the said concentrated milk product as regards the milk constituents; for example one may use skim milk powder as the starting material for the manufacture of the inoculating material to be added to sweetened condensed milk obtained from skim milk.

As the rubbing or pulverization of the powder containing the lactose in the crystallized state is effected in a concentrated milk product, a uniform distribution of the inoculating material throughout the concentrated milk product in which it is desired to control the crystallization of the lactose is greately promoted.

Owing to the fineness of the new inoculating material according to the present invention and the possibility of its uniform distribution, the cooling of the concentrated milk product can be accelerated, since after the mixing of the inoculating material with the concentrated milk product sufficient amounts of crystallization nuclei are present throughout the milk product.

The quantity of the new inoculating material to be used can be smaller than has been mentioned in the prior literature, for example for inoculation with ordinary lactose or ground lactose, while the result obtained is considerably better, this being due to the uniform and smaller size of the new inoculating material. Thus, when using the products according to the invention, it is, for example, sufficient to take 2 kg. of skim milk powder (or approximately 1.0 kg. of lactose) to 7000 kg. of condensed milk, while the prior literature prescribes, for example, 4.3 kg. of ordinary finely ground lactose to 7000 kg. of condensed milk.

The following are some examples of carrying out the process according to the present invention.

EXAMPLE I

Milk powder which has been obtained by drying milk by the spraying process and which contains the lactose in the vitreous state is caused to absorb moisture as quickly as possible, in order that the lactose may crystallize. This can be done most effectively by spreading the milk powder in a thin layer and spraying water over it. For 3 kg. of milk powder about ½ litre of water is required.

The milk powder treated as above is introduced into a ball mill, into which a quantity of sweetened condensed milk has previously been introduced, for example, 30 litres condensed milk to 3 kg. of milk powder, which condensed milk may be taken from the same lot for which the inoculating material is eventually to be used. This quantity of sweetened condensed milk should not contain any crystallized lactose, but is preferably supersaturated in lactose. When the treatment has been continued for some time, during which the milk powder particles are pulverized by the rubbing action of the balls and the small crystals of lactose are released, the inoculating material is ready for use.

In the case when 2 kg. of "crystallized" milk powder is introduced into the ball mill, the quantity of inoculating material obtained from this is suitable for inoculating approximately 7000 kg. of sweetened condensed milk. The results are still better when the quantity of milk powder taken is a little larger, as can be seen from the following table.

*Distribution of the size of the crystals in sweetened condensed milk in percentages*

| Number of lot | Quantity of milk powder added | 0–5µ | 5–10µ | 10–15µ | 15–20µ |
|---|---|---|---|---|---|
| | | Percent | Percent | Percent | Percent |
| 1 | 3 kg. per 7,000 kg. of condensed milk | 50 | 50 | | |
| 2 | 2 ig. per 7,000 kg | 49 | 49 | 2 | |
| 3 | 1 kg. per 7,000 kg | 37 | 50 | 12 | 1 |

The most suitable temperature for the addition of the inoculating material to the condensed milk is about 33°–35° C. The cooling can be continued as rapidly as possible, while stirring. After the mixing, such a large number of nuclei is present throughout the condensed milk treated that there is no longer any risk of larger lactose crystals being formed.

In the final product there is no settling of lactose crystals, and the lactose crystals are hardly perceptible organoleptically. By increasing or reducing the quantity of inoculating material one can influence the size of the crystals in the final product.

EXAMPLE II 1 part by weight of gelatine is dissolved in 10 parts by weight of water and 1 part by weight of lactose is dissolved in this solution. By rapid drying of the aforesaid solution by spraying a product is obtained in which the lactose is present in the vitreous state; when caused to absorb water however, the lactose in the product passes into the crystalline state. The lactose crystals are extremely fine and the product containing them can be used as inoculating material after it has been pulverized as described in Example I.

EXAMPLE III 1 part by weight of carboxymethyl cellulose (medium viscosity) is mixed with 30 parts by weight of water, and 1 part by weight of lactose is then dissolved in the mixture. By rapid drying through spraying a powder is obtained in which the lactose is present in the vitreous state. When this powder is caused to absorb water rapidly, the lactose passes into aggregates of extremely fine crystals. The aggregates can be disintegrated as described in Example I.

What I claim is:

1. A process for the preparation of an inoculating material suitable for improving the crystallization of lactose in concentrated milk products, comprising the steps of introducing a powder containing a water-soluble high molecular compound in addition to lactose in the crystallized state into a small quantity of a concentrated milk product not yet containing any crystallized lactose, and then pulverizing the mixture thereby to release small individual crystals of lactose from the crystallized lactose agglomerates.

2. A process according to claim 1, in which the water-soluble high molecular compound is a protein.

3. A process for the preparation of an inoculating material suitable for improving the crystallization of lactose in concentrated milk products, comprising the steps of moistening a powder containing a protein and lactose in a vitreous state until said powder absorbs a quantity of water such that the lactose passes into the crystallized state, introducing the powder thus obtained into a small quantity of a concentrated milk product not yet containing any crystallized lactose, and then pulverizing the mixture thereby to release small individual crystals of lactose from the crystallized lactose agglomerates.

4. A process as claimed in claim 3, in which the concentrated milk product is condensed milk.

5. A process as claimed in claim 3, in which the concentrated milk product is sweetened condensed milk.

6. A process for the preparation of an inoculating material suitable for improving the crystallization of lactose in concentrated milk products, comprising the steps of moistening milk powder obtained by drying milk and containing lactose in a vitreous state until said powder absorbs a quantity of water such that the lactose passes into the crystallized state, introducing the powder thus obtained into a small quantity of a concentrated milk product not yet containing any crystallized lactose, and then pulverizing the mixture thereby to release small individual crystals of lactose from the crystallized lactose agglomerates.

7. A process as claimed in claim 6, in which milk powder is used which has been obtained by drying milk by the spraying process.

8. A process for the preparation of an inoculating material suitable for improving the crystallization of lactose in condensed milk, comprising the steps of moistening milk powder obtained by drying milk and containing lactose in a vitreous state until said powder absorbs a quantity of water such that the lactose passes into the crystallized state, introducing the powder thus obtained into a small quantity of condensed milk not yet containing any crystallized lactose, and then pulverizing the mixture thereby to release small individual crystals of lactose from the crystallized lactose agglomerates.

9. A process for the preparation of an inoculating material suitable for improving the crystallization of lactose in sweetened condensed milk, comprising the steps of moistening milk powder obtained by drying milk and containing lactose in a vitreous state until said powder absorbs a quantity of water such that the lactose passes into the crystallized state, introducing the powder thus obtained into a small quantity of sweetened condensed milk not yet containing any crystallized lactose, and then pulverizing the mixture thereby to release small individual crystals of lactose from the crystallized lactose agglomerates.

10. A process as claimed in claim 8, in which milk powder obtained by drying milk by the spraying process is used.

11. A process as claimed in claim 9, in which milk powder which has been obtained by drying milk by the spraying process is used.

12. A process for the preparation of an inoculating material suitable for improving the crystallization of lactose in condensed milk, comprising the steps of introducing a powder containing a water-soluble high molecular compound in addition to lactose in the crystallized state into a small quantity of condensed milk which is supersaturated in lactose, and then pulverizing the mixture thereby to release small individual crystals of lactose from the crystallized lactose agglomerates.

13. A process for the preparation of an inoculating material suitable for improving the crystallization of lactose in sweetened condensed milk, comprising the steps of introducing a powder containing a water-soluble high molecular compound in addition to lactose in the crystallized state into a small quantity of sweetened condensed milk which is supersaturated in lactose, and then pulverizing the mixture thereby to release small individual crystals of lactose from the crystallized lactose agglomerates.

14. A process for the preparation of an inoculating material suitable for improving the crystallization of lactose in condensed milk, comprising the steps of introducing a powder containing a protein and lactose in the crystallized state into a small quantity of condensed milk which is supersaturated in lactose, and then pulverizing the mixture thereby to release small individual crystals of lactose from the crystallized lactose agglomerates.

15. A process for the preparation of an inoculating material suitable for improving the crystallization of lactose in condensed milk, comprising the steps of moistening milk powder obtained by drying milk and containing lactose in a vitreous state until said powder absorbs a quantity of water such that the lactose passes into the crystallized state, introducing the powder thus obtained into a small quantity of condensed milk which is supersaturated in lactose, and then pulverizing the mixture thereby to release small individual crystals of lactose from the crystallized lactose agglomerates.

16. A process as claimed in claim 15, characterized in that the condensed milk is sweetened condensed milk.

17. A process for improving the crystallization of lactose in concentrated milk products, comprising the steps of introducing a powder containing a water-soluble high molecular compound in addition to lactose in the crystallized state into a small quantity of a concentrated milk product not yet containing any crystallized lactose, pulverizing the mixture thereby to release small individual crystals of lactose from the crystallized lactose agglomerates, and then inoculating the concentrated milk product in which lactose has not yet separated with a small quantity of the pulverized mixture.

18. A process as claimed in claim 17, in which the water-soluble high molecular compound is a protein.

19. A process for improving the crystallization of lactose in concentrated milk products, comprising the steps of introducing milk powder obtained by drying milk and containing lactose in the crystallized state into a small quantity of a concentrated milk product not yet containing any crystallized lactose, pulverizing the mixture thereby to release small individual crystals of lactose from the crystallized lactose agglomerates, and then inoculating the concentrated milk product in which lactose has not yet separated with a small quantity of the pulverized mixture.

20. A process for improving the crystallization of lactose in condensed milk, comprising the steps of introducing a powder containing a water-soluble high molecular compound in addition to lactose in the crystallized state into a small quantity of condensed milk not yet containing any crystallized lactose, pulverizing the mixture thereby to release small individual crystals of lactose from the crystallized lactose agglomerates, and then inoculating the condensed milk not yet containing any crystallized lactose with a small quantity of the pulverized mixture.

21. A process for improving the crystallization of lactose in sweetened condensed milk, comprising the steps of introducing a powder containing a water-soluble high molecular compound in addition to lactose in the crystallized state into a small quantity of sweetened condensed milk not yet containing any crystallized lactose, pulverizing the mixture thereby to release small individual crystals of lactose from the crystallized lactose agglomerates, and then innoculating sweetened condensed milk not yet containing any crystallized lactose with a small quantity of the pulverized mixture.

References Cited in the file of this patent

UNITED STATES PATENTS

| 2,188,907 | Lavett | Feb. 6, 1940 |
| 2,197,804 | Lavett | Apr. 23, 1940 |
| 2,209,328 | Dietrich et al. | July 30, 1940 |

OTHER REFERENCES

O. F. Hunziker: "Condensed Milk and Milk Powder," sixth edition, published by the author, La Grange, Illinois, pages 168 to 171, 172, 173 and pages 402, 403, 405.